United States Patent
Bing et al.

[11] Patent Number: 6,105,540
[45] Date of Patent: Aug. 22, 2000

[54] COOLED RING CARRIER ASSEMBLY

[75] Inventors: Karlheinz Bing, Remseck; Thomas Hackh; Martin Rühle, both of Stuttgart, all of Germany

[73] Assignee: Mahle GmbH, Stuttgart, Germany

[21] Appl. No.: 09/187,667

[22] Filed: Nov. 6, 1998

[30] Foreign Application Priority Data

Nov. 12, 1997 [DE] Germany .............. 197 50 021

[51] Int. Cl.[7] .................................................. F02F 3/18
[52] U.S. Cl. ............................................... 123/41.35
[58] Field of Search ..................................... 123/41.35

[56] References Cited

U.S. PATENT DOCUMENTS

| | | | |
|---|---|---|---|
| 4,067,307 | 1/1978 | Hofle et al. | 123/41.35 |
| 4,120,081 | 10/1978 | Rosch et al. | 29/888.045 |
| 4,907,545 | 3/1990 | Mills | 123/41.35 |
| 5,771,776 | 6/1998 | Itoh | 92/186 |
| 5,947,065 | 9/1999 | Bing et al. | 123/41.35 |

FOREIGN PATENT DOCUMENTS

| | | |
|---|---|---|
| 0 791 738 | 8/1997 | European Pat. Off. . |
| 72 12 560 | 4/1972 | Germany . |
| 76 17 370 | 5/1976 | Germany . |
| 26 24 412 | 1/1983 | Germany . |
| 5-2 40 347 | 9/1993 | Japan . |

*Primary Examiner*—Willis R. Wolfe
*Assistant Examiner*—Jason Benton
*Attorney, Agent, or Firm*—Collard & Roe, P.C.

[57] ABSTRACT

A cooled ring carrier assembly for the piston of an internal combustion engine, comprising a metal-sheet cooling duct welded to a ring carrier. The cooling duct is press-fit into the inwardly-pointing surfaces of the ring carrier prior to welding. The angle between the inwardly pointing surface of the ring carrier, to which surface metal-sheet cooling duct is welded, and the metal-sheet cooling duct is smaller than 45°. This allows the cooling duct to be press fit into the ring carrier rather than being shrunk in by temperature differences between the ring carrier and cooling duct.

2 Claims, 1 Drawing Sheet

COOLED RING CARRIER ASSEMBLY

BACKGROUND OF THE INVENTION

1. Field of the Invention

The present invention relates to a cooled ring carrier assembly. In particular, this invention relates to a cooled ring carrier assembly that allows for a safe and tight welded joint between the ring carrier and a metal sheet cooling duct when the duct is secured on the ring carrier.

2. The Prior Art

A ring carrier is known from DE 26 24 412, where a planar circular metal sheet is placed against the lower flank of a ring carrier, bent around the ring carrier so as to assume a U-shaped cross section, placed in pre-turned recesses of the ring carrier, clamped tight, and subsequently welded. As the metal sheet is bent around the ring carrier in the a U-shaped form, it is possible to obtain a substantial undercut between the metal sheet cooling duct and the ring carrier. The drawback of this method is the handling of the metal sheet during bending, which is limited by the ring carrier, and the fact that the metal sheet has to be clamped tight before it is welded. Furthermore, it has been found that it is not possible to safely ensure a pressure-tight connection between the metal sheet cooling duct and the ring carrier, which is a precondition for casting the ring carrier.

Another ring carrier assembly is disclosed in U.S. Pat. No. 4,907,545. In this patent the metal sheet is secured on the ring carrier by welding or soldering. As shown in FIGS. 1 and 4, the metal sheet is butt-joined with the radially inwardly disposed wall, or with the bridges of the ring carrier extending from the wall. In FIGS. 5, 6 and 7, the metal sheet is placed flat against plane or curved surfaces of the ring carrier. All of these embodiments have the common characteristic that prior to welding, the metal sheet has to be shrunk into the ring carrier in a costly manner by temperature differences, or that it has to be clamped tight during welding, and that the cross section of the welding seams are relatively small. This patent also has the drawback that during shrinking with a butt joint, the relatively thin metal sheet is stressed and can buckle.

Ring carrier assemblies of this type are also shown in Japanese Patent No. 05-240347 and European Patent No. 791 723. In these documents, too, the metal sheet forming the cooling duct or channel is either shrunk into the cylinder-shaped, radially inwardly disposed surface of the ring carrier by application of temperature differences, or shrunk into grooves milled into the ring carrier.

SUMMARY OF THE INVENTION

It is an object of the present invention to provide a ring carrier assembly that enables the securing of a metal sheet cooling duct on the ring carrier prior to the welding process so that a safe and tight welded joint can be produced between the ring carrier and the metal sheet cooling duct.

It is another object of the invention to provide a ring carrier assembly in which clamping means or devices for the cooling duct can be eliminated in the welding process.

It is a further object of the invention to provide a ring carrier assembly in which a shrinking-in of the cooling duct with application of temperature differences can be omitted as well.

These and other objects of the invention are provided by a ring carrier assembly comprising a ring carrier having at least one radially inwardly pointing circularly cylindrical surface and a cooling duct press-fit into the ring carrier via two edges circumferentially contacting the ring carrier on the inwardly pointing surface or surfaces.

According to the invention, the angle between the inwardly pointing surface or surfaces of the ring carrier and the metal sheet cooling duct is smaller than 45° within the region of its two edges or surfaces contacting the ring carrier. The term "metal sheet cooling duct" also relates to a metal sheet component having an opening extending all around and pointing at the ring carrier. The difference in diameter between the ring carrier and the metal sheet cooling duct may amount to 0.4 mm. The elastic component of the deformation during pressing-in is about 0.15 to 0.2 mm, which means a certain proportion of plastic deformation of the metal sheet cooling duct is added when the cooling duct is pressed in to the ring carrier.

The radially inwardly pointing surface of the ring carrier on which the metal sheet cooling duct is clamped may also consist of two circularly cylindrical part surfaces with different diameters. In this case, the two edges or surfaces contacting the ring carrier have different diameters as well.

To ensure exact axial positioning of the metal sheet cooling duct in the ring carrier, a bridge with a height of a few tenths of one millimeter may be produced by turning on the inwardly pointing surface of the ring carrier, so that one edge or both circular edges of the metal sheet cooling duct rests against the bridge.

The basic idea of the invention is to make use of the elastic properties of the metal sheet to clamp it in the ring carrier and for safely welding the ring carrier and the metal sheet cooling duct together without having to shrink it into the ring carrier via temperature differences, i.e., cooling of the metal sheet cooling duct and/or heating of the ring carrier. If the edges or surfaces of the metal sheet cooling duct contacting the ring carrier are brought into contact with the inside surface of the ring carrier at a relatively small angle, the metal sheet cooling duct can be pressed into the ring carrier in an initially tensioned (or pretensioned) state with the help of a mounting or installation device, even though its outside diameter immediately prior to its installation is greater than the inside diameter of the ring carrier. This method is not applicable or can be applied only with great difficulties if the cooling duct has radially extending edges.

The additional advantage gained is that during welding, a relatively large sealing area is produced on the transition between the ring carrier and the metal sheet cooling duct as compared to a butt joint of the metal sheet edges on the ring carrier. Such large sealing area reduces the probability of loose spots or leaks.

A further advantage of the advantage of the invention is that the ring carrier can retain its usual, approximately rectangular cross sectional shape, aside from the annular grooves that have to be milled in, and that no special contours have to be produced on the backs of the ring carriers by turning or molding.

Laser welding, electric arc welding and microplasma welding are suitable welding methods for joining the ring carrier and the metal sheet cooling duct. The additional material that can be required under certain circumstances in the welding process can be admitted either from the outside or may be present already on the ring carrier in the form of an edge that is melted off. The goal is to fill the gap or gusset between the ring carrier and the metal sheet cooling duct, which has a wedge shaped cross section, with as much melt as possible, as this will make it most likely that a pressure-tight connection or joint is obtained.

It also possible to retain the geometry of the components to be joined with a maximum angle of 45° between the metal sheet cooling duct and the inwardly pointing surface of the ring carrier, and to produce the metal sheet cooling duct under otherwise the same conditions with an outside diameter slightly smaller that the inside diameter of the ring carrier. Prior to or in the course of the welding process, the metal sheet cooling duct is either widened from the inside, and clamped into the ring carrier in this condition, or clamping of the metal sheet cooling duct into the ring carrier is omitted. This has the advantage that the geometry of the welding seam permits a pressure-tight joint across the entire circumference because of the large cross section of the seam.

BRIEF DESCRIPTION OF THE DRAWINGS

Other objects and features of the present invention will become apparent from the following detailed description considered in connection with the accompanying drawing which discloses an embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
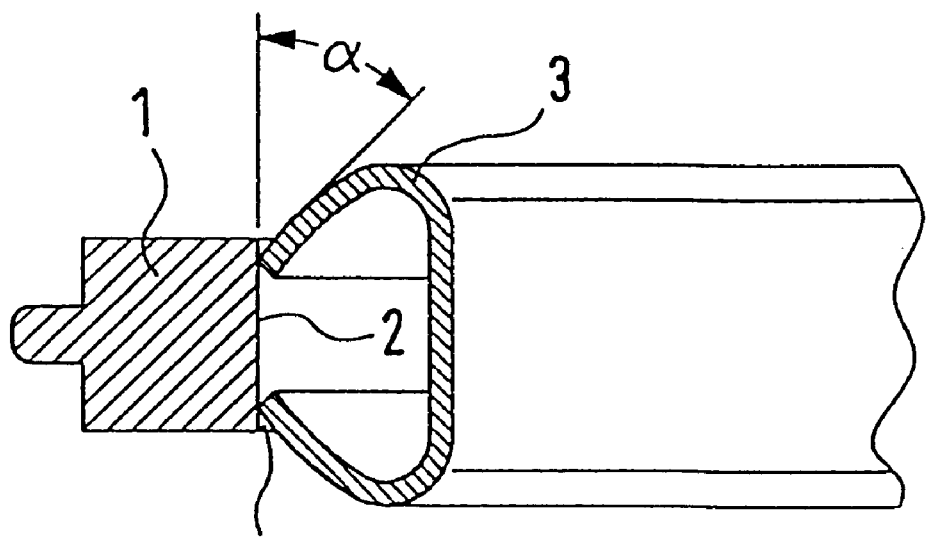
FIG. 1 shows a cross-sectional view of a cooled ring carrier assembly as defined by the invention, shown before the ring carrier and the metal sheet cooling duct are joined by welding.

Referring in detail to the drawings, FIG. 1 shows the cooled ring carrier assembly consisting of a circular ring carrier 1 with a radially inwardly pointing circularly cylindrical surface 2 and a metal sheet cooling duct 3 made from austenitic steel. Cooling duct 2 is produced in one piece from plane steel sheet by plastic deformation.

Before ring carrier 1 and metal-sheet cooling duct 3 are joined by welding, metal-sheet cooling duct 3 is pressed into ring carrier 1 with the help of a mounting or fitting device (not shown). The mounting device is designed so that the outside diameter of metal-sheet cooling duct 3 is reduced by axially applied pressure, for example in a cone-shaped receptacle, and that it then can be pressed in this prestressed condition from the mounting device into ring carrier 1. Sheet-metal cooling duct 3 is subsequently firmly clamped in ring carrier 1 in such a way that no clamping means are needed in the welding step. Before the sheet-metal cooling duct is pressed into place, its outside diameter exceeds the inside diameter of the ring carrier by about 0.35 mm. This causes tangential pressure stresses to develop on the inside circumference of metal-sheet cooling duct 3 as it is being pressed into place. Angle $\alpha$ between the inwardly pointing surface(s) 2 of ring carrier 1 and metal-sheet cooling duct 3 amounts to 35° within the region of its two edges 4 contacting ring carrier 1. As a result thereof, metal-sheet cooling duct 3 can be smoothly pressed into ring carrier 1 and is seated in carrier 1 as solidly as when shrunk into ring carrier 1 via differences in temperature.

Figure 2:
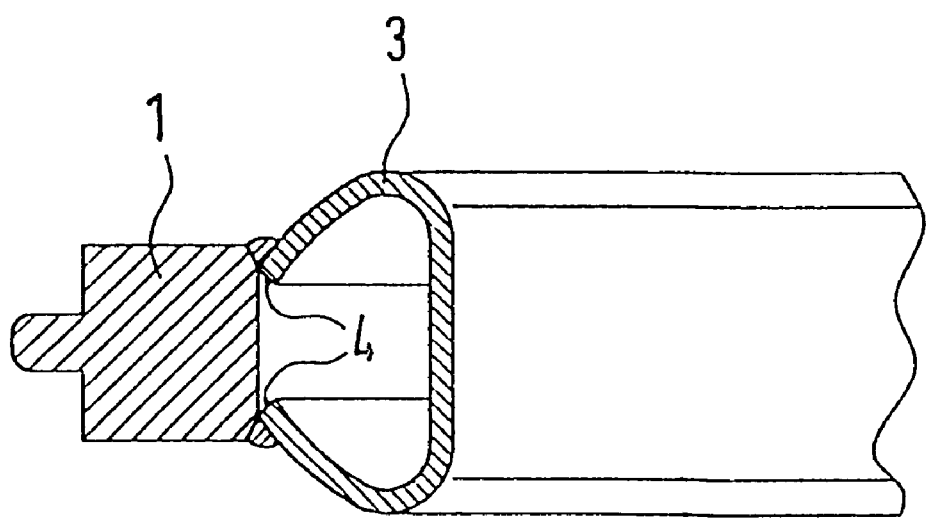
FIG. 2 shows the ring carrier assembly as defined by the invention in the welded condition.

FIG. 2 shows that the annularly extending gusset or wedge-shaped gap 5 is filled with melt as ring carrier 1 and sheet metal cooling duct 3 are welded together.

This leads to good sealing of metal-sheet cooling duct 3, so that when Alfin bonding is carried out before the cooled ring carrier assembly is cast in the piston, and during casting, no included gases can exit from the metal-sheet cooling duct and contaminate the melt by forming oxide.

Accordingly, while only a single embodiment of the present invention has been shown and described, it is to be understood that many changes and modifications may be made thereunto without departing from the spirit and scope of the invention as defined in the appended claims.

What is claimed is:

1. A cooled ring carrier assembly for a piston of an internal combustion engine, comprising:

a ring carrier having at least one radially inwardly pointing circularly cylindrical surface; and a cooling duct made of a metal sheet and securable via welding on said surface, said cooling duct being press fit into the ring carrier via two edges circumferentially contacting the ring carrier on said at least one inwardly pointing surface, wherein an angle $\alpha$ between the inwardly pointing surface of the ring carrier and the cooling duct near each of the edges contacting the ring carrier is less than 45°.

2. The ring carrier assembly according to claim 1, wherein the metal sheet has two face sides that approximately face each other.

\* \* \* \* \*